United States Patent [19]

Gunther et al.

[11] Patent Number: 5,276,666
[45] Date of Patent: Jan. 4, 1994

[54] BIT SHIFT POST-COMPENSATION USING SAMPLED DATA PREQUALIFIER

[75] Inventors: Douglas A. Gunther, Lakewood; Joe K. Jurneke, Brighton; Brahim Lekmine, Denver; Donald L. Millican, Westminster, all of Colo.

[73] Assignee: Storage Technology Corporation, Louisville, Colo.

[21] Appl. No.: 846,527

[22] Filed: Mar. 4, 1992

[51] Int. Cl.⁵ .................................................. G11B 7/00
[52] U.S. Cl. ......................................... 369/59; 369/60; 369/44.34; 360/45
[58] Field of Search ................... 369/59, 47, 48, 54, 369/50, 44.34, 124, 60; 360/45, 46, 53, 32, 72.2

[56] References Cited

U.S. PATENT DOCUMENTS

| | | | |
|---|---|---|---|
| 3,577,192 | 5/1971 | Schlaepfer | 340/174.1 H |
| 3,719,934 | 3/1973 | Behr et al. | 340/174.1 H |
| 3,735,372 | 5/1973 | Coccagna | 340/174.1 H |
| 3,810,232 | 5/1974 | Aghazadeh | 340/174.1 H |
| 4,742,403 | 5/1988 | Troletti | 360/45 |
| 4,885,645 | 12/1989 | Hashimoto | 360/45 |
| 5,187,614 | 2/1993 | Hashimoto et al. | 360/45 |

Primary Examiner—Andrew L. Sniezek
Assistant Examiner—Muhammad N. Edun
Attorney, Agent, or Firm—Duft, Graziano & Forest

[57] ABSTRACT

A circuit and method for correcting peak signal shifts in analog signals representing binary data bits that avoids the need for write precompensation techniques. Three different sample values (an early, on-time, and late) are computed for the signal representing each read bit. The on-time signal value of each data bit of an n-bit sequence is used if no data corruption is detected. If a corrupted data bit is detected due to an early or late peak signal shift of an adjacent binary 1, the early or late signal value of the corrupted data bit is used rather than the on-time signal value of the corrupted bit. The corrected data bit sequence is then passed on to a utilization circuit, such as a read data detector, which uses error correcting techniques and the like to determine with precision whether each data bit is a binary 1 or a ∅.

16 Claims, 6 Drawing Sheets

FIG.3. TYPICAL SAMPLED READ SIGNAL WITH NO INTERFERENCE

FIG. 4. TYPICAL SAMPLED READ SIGNAL WITH "NO" INTERSYMBOL INTERFERENCE

FIG. 5.

BIT SHIFT POST-COMPENSATION USING SAMPLED DATA PREQUALIFIER

FIELD OF THE INVENTION

This invention relates to a method of and apparatus for correcting data signal errors represented by peak shifts or bit shifts relative to the bit cell window, and, in particular, peak shifts of signals read from a storage medium such as, for example, a magnetic tape or disk. This invention still further relates to the correction of peak shifts or bit shift signal errors using bit shift post-compensation during a data read operation.

PROBLEM—BACKGROUND OF THE INVENTION

High density recording and playback techniques are currently used to achieve operational advantages and economies in data processing and storage systems. The current trend is toward increasingly high data storage densities. While the recording, storage and playback of high density data is advantageous, it has certain operational disadvantages. A primary one of these is the generation of erroneous signals when data is read from a high density medium. This is sometimes caused by a phenomenon termed intersymbol interference which occurs when bits read from a high density medium are not applied to the processing circuitry during their allotted sampling time. Instead, a data bit can appear either late (L) or early (E) rather than on-time (OT) relative to its bit cell clock window. This phenomenon is known as intersymbol interference or peak shifts. It occurs primarily in bipolar recording in which successive binary 1s are of the opposite polarity such as $+1 -1 +1$ or $+1 \emptyset -1 \emptyset\emptyset +1$, etc.

A data bit shift can result in defective data when a binary 1 appears either early or later relative to its clock window. When it occurs, it corrupts the signal representing an adjacent binary $\emptyset$. Thus, a data pattern of $+1 \emptyset -1 +1$ may be corrupted by an early shift of the $-1$ so that the resulting data appears as $+1 -1 -1 +1$. A late data bit shift occurs when a data pattern such as $-1 +1 \emptyset -1$ is corrupted by a data bit shift of the $+1$ so that the resultant data pattern appears as $-1 +1 +1 -1$. A $+1$ or a $-1$ denotes that the amplitude of the respective data bit is above the detection threshold. A $\emptyset$ denotes that the amplitude is below the detection threshold.

Heretofore, the problem associated with data bit shift or intersymbol interference has been minimized by a technique known as write pre-compensation. Since data bit shifts are typically associated with data patterns in which a binary 1 is adjacent one or more binary $\emptyset$s, this pattern can be detected in advance and the data bit shift problem may be avoided to some extent by the use of what is termed a write pre-compensation. The write pre-compensation functions by detecting the vulnerable data bit patterns and by altering the recording process (write pulses) so that the possibility of recorded data being corrupted by a data bit shift is minimized. The write pre-compensation performs this function by detecting the data bit patterns that are subject to either an early or late shift, and by moving the data bit that is vulnerable to a possible data bit shift in the direction required to minimize a possible corruption of an adjacent binary $\emptyset$.

Although the use of write pre-compensation techniques tend to minimize, but not eliminate, the data bit shift problem, they have a number of disadvantages that preclude them from being the ultimate solution. First of all, it is not always possible to predict with complete accuracy the time by which a signal peak will shift with respect to its clock window. Therefore the write pre-compensation apparatus may either fail to alter the time at which a data bit subject to shift is recorded or, alternatively, may erroneously move a data bit that is not subject to data bit shift. Another problem with write pre-compensation is that the speed of the magnetic medium, such as a tape, may not be identical for both the recording and playback function and therefore, the data bit shift may not be correctly compensated for. Another factor is that playback apparatus that is designed to operate only with tapes that are written using the write pre-compensation techniques, will be subject to data bit shift errors if it plays back tapes that were recorded without the use of the write pre-compensation techniques.

It can be seen from the above that data bit shift problems can occur with high density recording and that the use of pre-qualifying sampled data write compensation techniques is only a partial solution to the problem. There is therefore a need for apparatus that compensates for the playback of shifted data bits so as to minimize the corruption of the data represented by the shifted bits.

SOLUTION—SUMMARY OF THE INVENTION

The above problems are solved and an advance in the art is achieved by the use of a method and apparatus which detects and corrects data represented by shifted data bits. The circuitry and method of the present invention analyzes each different sequence of n bits (where n may be a sequence of three or four bits, for example) and determines whether the sequence represents valid or corrupted data. Bipolar recording is used in recording the data and therefore successive binary 1s, whether or not separated by one or more intervening $\emptyset$s, are characterized by signals of the opposite polarity such as $+1 -1 +1$ etc. A data bit sequence is assumed to represent good data, insofar as data bit shifts are concerned, if successive binary 1s are of the opposite polarity. Two successive binary 1s of the same polarity, whether or not separated by one or more intervening $\emptyset$s, are assumed to represent invalid data. The method and apparatus of the present invention detects invalid data sequences and attempts to correct such data if they are caused by a bit shift of a binary 1.

Further in accordance with the present invention, signal processing circuitry, including an analog-to-digital (A/D) converter, quantizes a plurality of samples of each received bit. The signal processing circuitry derives an "on-time" computed average value for each data bit as well as an "early" and a "late" computed average value. Each value is computed using a plurality of successive samples including a summation and a division thereof in order to determine an average value.

Let it be assumed that each data bit is sampled six times with the six successive samples being designated n through n+5. Each average value, namely, early, on-time and late of a bit, is computed by using a sequence of four different successive ones of these samples. The early averaged value is determined using the samples n, n+1, n+2, and n+3. This is done by adding these four samples to determine the sum, and by dividing the sum by four to derive the average value of the first four samples. The on-time value is determined by adding together the four samples n+1, n+2, n+3 and n+4, by summing these and dividing the sum by four to derive an averaged on-time value. The late value is taken in a similar manner with the use of the four samples n+2, n+3, n+4 and n+5.

The derived early, on-time and late averaged values of each received data bit are stored in different registers of the processing circuitry until the early, on-time and late values of the entire sequence of n bits is received, processed in the same manner, and stored. A system controller analyzes the on-time values of the n data bit sequence and if the on-time values appear to represent valid data (no successive binary 1s of the same polarity), the n data bit data sequence is assumed to be valid insofar as the problem of bit shifts is concerned. The system then outputs the stored data to a signal utilization circuit for further use or processing.

If the on-time values of a received n data bit sequence indicate successive binary 1s having the same polarity, the data is assumed to be corrupted and the system of the present invention takes steps to compensate for and correct this data corruption. This is accomplished by the system controller substituting the early or late value of a corrupted data bit for the on-time value of the bit. For example, let it be assumed that a valid sequence of 0 0 −1 +1 is corrupted by an early bit shift of the −1 and as 0 −1 −1 +1 upon playback. The second binary data bit in the corrupted sequence, namely the first −1, is caused by an early shift of the third data bit (the second −1). The system controller detects this condition and substitutes the early value of the second and third bits for the on-time value of the second bit. Assuming the early bit shift of the third data bit (−1) is not extreme, the use of the early value of the second and third bits should cause a 0 for the second data bit to be read out in place of a −1. In this manner, the corrupted sequence is converted to a valid sequence when the early value of 0 for the second data bit is used as a substitute for the on-time value of −1 for the second bit.

The system of the present invention corrects late data bit shifts in a similar manner. Consider a valid sequence of +1 −1 0 0 that is corrupted when second data bit of −1 is subject to a late shift so that it corrupts the third data bit of 0. In this case, the corrupted data bit pattern is a +1 −1 −1 0. The system of the present invention detects this corrupted sequence and replaces the on-time value of the corrupted third data bit (−1) with the late value of 0 for the second and third bits. The substitution of the late value of the second and third bits results in the valid sequence of +1 −1 0 0 being applied to the signal utilization circuit.

In this manner, the system of the invention detects patterns containing binary 0s which may be corrupted by either an early or late shift of adjacent binary 1 and substitutes either the early or late value of the corrupted binary 0 so that valid data is generated at the output of the signal processing circuitry.

BRIEF DESCRIPTION OF THE DRAWING

The invention may be better understood from a reading of the following detailed description thereof taken in conjunction with the drawing in which.

DETAILED DESCRIPTION

Figure 1:
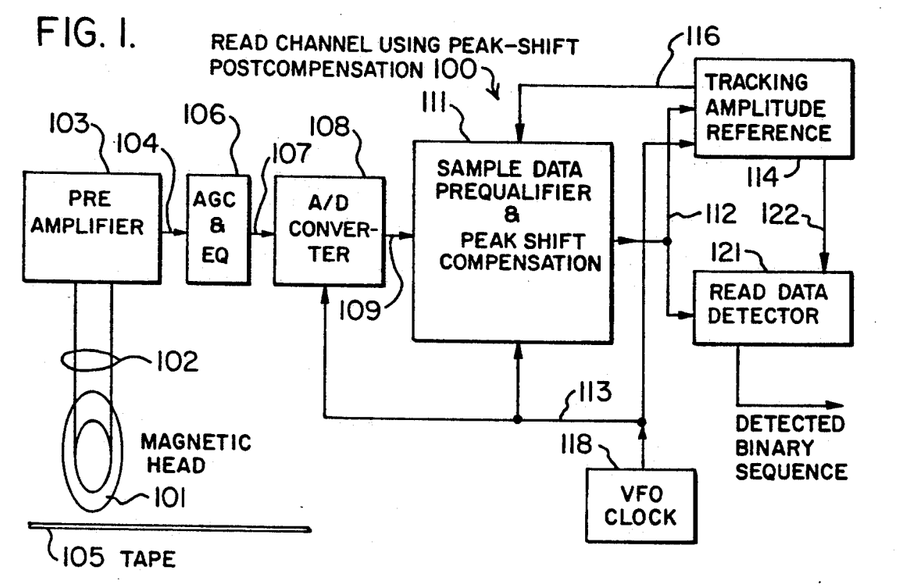
FIG. 1 is a block diagram of the invention.

FIG. 1 discloses one possible exemplary embodiment of the invention as comprising a magnetic read head 101 which reads data signals from an associated magnetic medium, such as tape 105, and applies them over path 102 to preamplifier 103. Preamplifier 103 amplifies the received signals and applies them over path 104 to AGC and equalizer circuit 106 which performs an automatic gain control and filtering function and applies an equalized output signal having a controlled maximum amplitude over path 107 to A/D converter 108. Converter 108 samples the analog data signal on path 107 and applies a digital signal to path 109 representing the amplitude of signal 107 on each sample. The signal on path 109 is applied to the input of the sampled data pre-qualifier and peak shift compensation circuit 111 which sums and averages the samples. Peak shift compensation circuit 111 also determines whether each received sequence of n bits represents valid data or data corrupted by a shift of one or more bits in the sequence. If data corruption is detected, circuit 111 attempts to correct the corrupted sequence.

The system of FIG. 1 is controlled by the signals applied to path 113 by VFO clock 118. Under good data operating conditions, the data read by magnetic head 101 is processed by elements 103, 106 and 108 and the signal for each data bit read by head 101 is received on path 109 in a specified time, termed a bit cell, with the peak of a received signal representing a binary 1 on path 109 being in the middle of its bit cell. However, these ideal operating conditions do not always pertain and when certain data bit patterns are read by head 101, the signal peaks for binary 1s may be shifted in time so that the peak of each data bit does not always lie within its assigned data bit cell. Instead, a data bit may be either delayed or advanced in time so that a portion of the signal peak for a binary 1 extends into the bit cell of an adjacent signal representing a binary 0. This is undesirable since the overlapping of a binary 1 signal into an adjacent bit cell of a binary 0 corrupts the signal for the binary 0. A signal peak detector cannot therefore be used alone to determine whether a received signal represents a binary 1 or a binary 0. The overlapping of the relatively large amplitude of a shifted binary 1 signal into the bit cell for a binary 0 would cause the peak detector to erroneously indicate that the signal for the bit 0 cell represents a binary 1.

The sampled data pre-qualifier and peak shift compensation element 111 overcomes the operational problems associated with peak shift by analyzing a sequence of n bits to determine the values of bits immediately succeeding and preceding a shifted bit. This function is termed peak shift signal compensation and it is performed by the sample pre-qualifier and peak shift compensation element 111 which analyzes a data bit sequence, corrects the value of any shifted binary 1 and any adjacent binary 0s, and applies a corrected output signal over path 112 to Read Data Detector 121. Tracking amplitude reference 114 assists elements 111 and 121 in determining whether each received data bit is above or below a predetermined variable threshold values. It does this by means of signals applied to paths 116 and 122.

Figure 2:
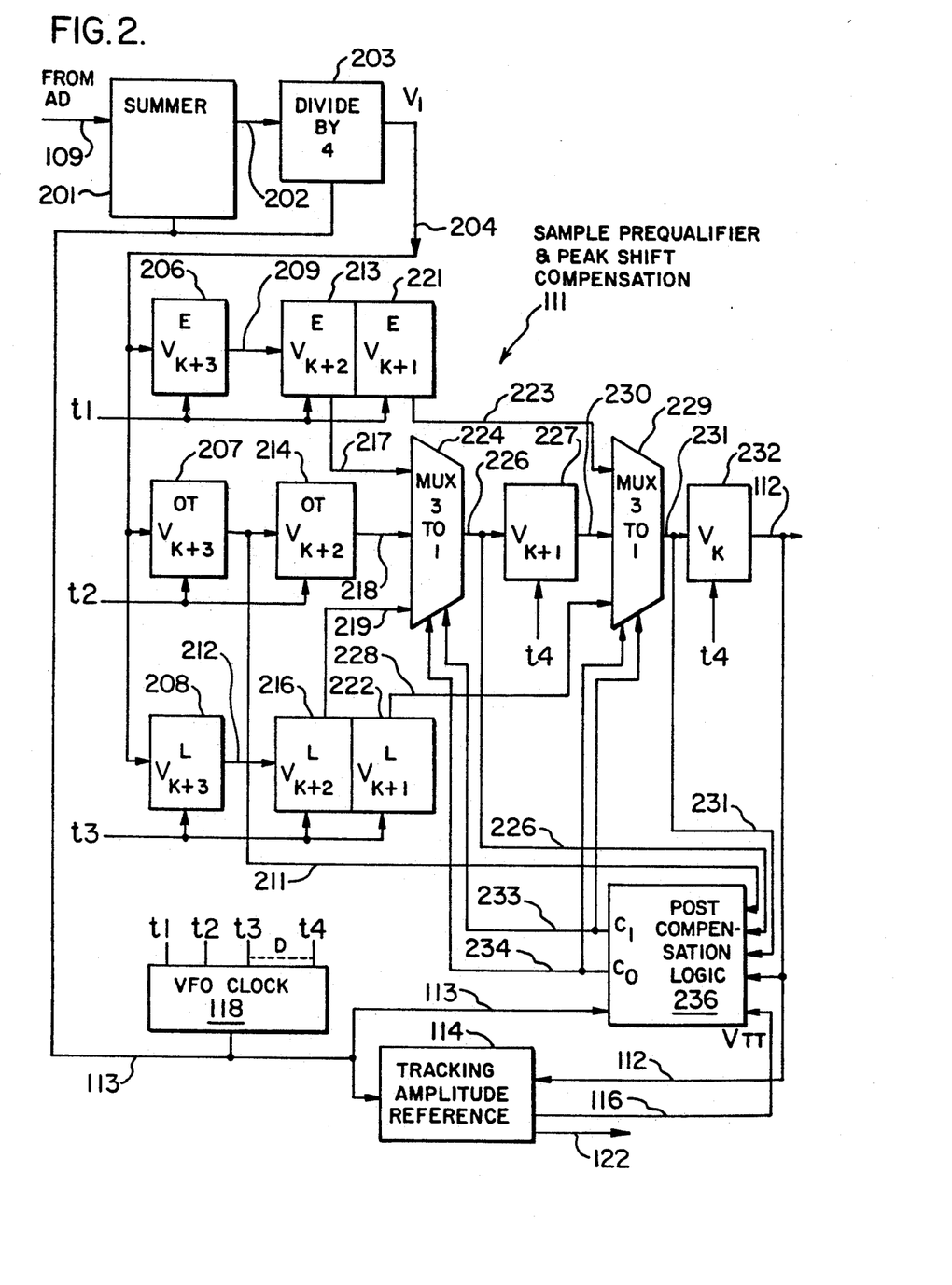
FIG. 2 discloses further details of the sampled data prequalifier and peak shift post-compensation circuit of FIG. 1.

Description of FIG. 2

FIG. 2 discloses further details of the sampled data pre-qualifier and peak shift compensation element 111 of FIG. 1. Elements on FIG. 2 which are also shown on FIG. 1 are designated identically as on FIG. 1 with a reference number in the 100 series. Elements of FIG. 2 that are not shown on FIG. 1 are designated with a reference designation in the 200 series.

The sampled data pre-qualifier and peak shift compensation element 111 receives input signals over path 109 from the A/D converter 108 representing the amplitude of the data read by head 101. Each received signal sample on path 109 represents one-fourth of a data bit as an 8-bit binary word representing the quantized value of the analog signal for the corresponding sample of the data bit on path 107. The sampled data pre-qualifier and peak shift compensation element 111 receives the binary words on path 109 representing this amplitude information, processes them as subsequently described and applies an output signal over path 112 to Read Data Detector element 121 to generate the binary values of the data bits represented by the signals on path 109. The elements of FIG. 2 thus detect and compensate for any peak shift of a received data bit so that binary 0s are not corrupted when a shifted binary 1 partially overlaps the bit cell of the binary 0.

Figure 3:
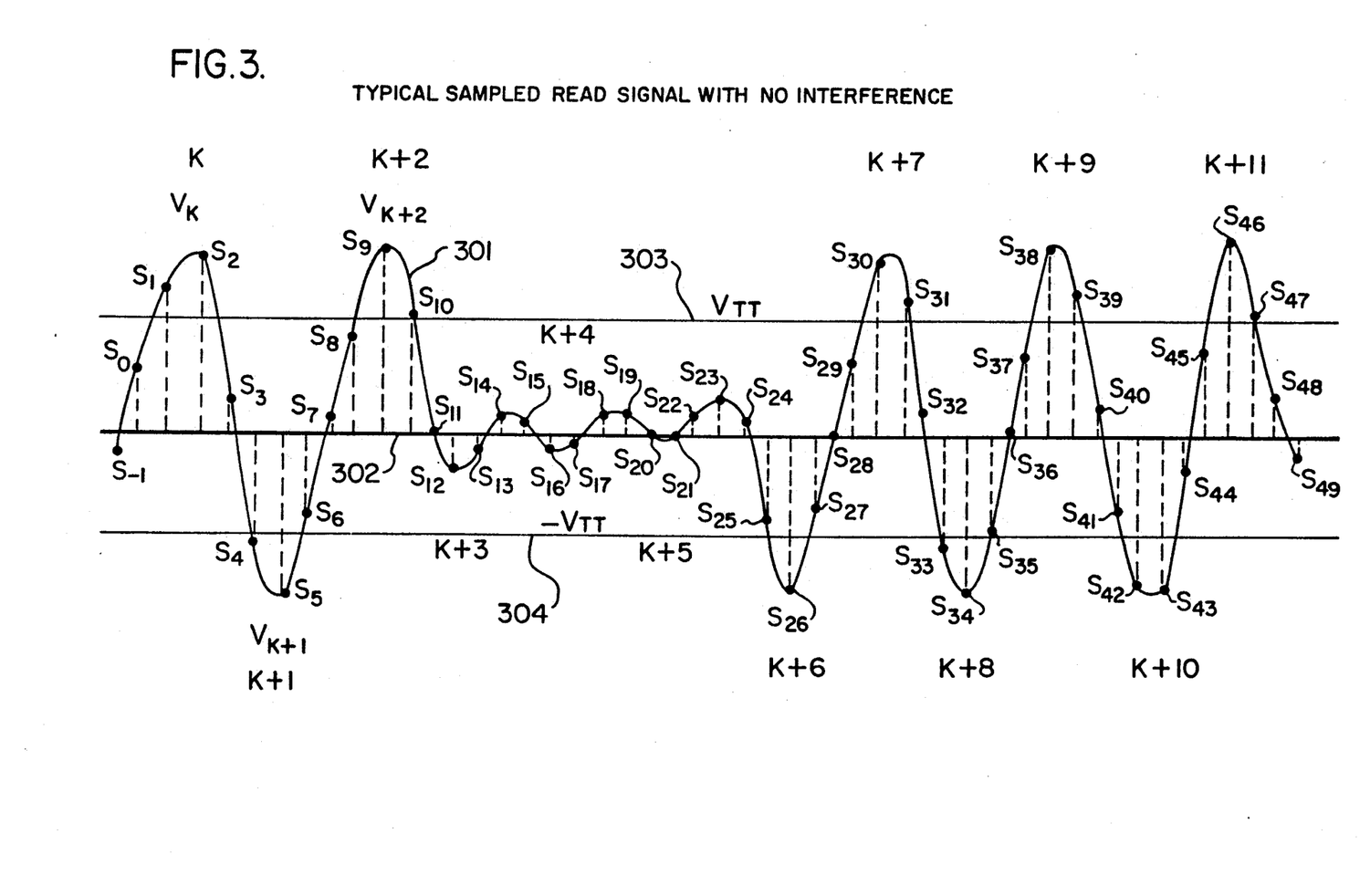
FIG. 3 is a wave form of sampled signals received by the peak shift compensation circuit for conditions in which no peak shifts are contained in the received data signals.

Before proceeding further with a description of FIG. 2, a consideration of FIG. 3 is useful. FIG. 3 displays the waveform of a typical analog input signal 301 received on path 107 by A/D converter 108. Waveform 301 represents "good data" read by head 101. "Good data" is data that does not contain intersymbol interference associated with an early or late shift of a binary 1.

A plurality of read bits are represented by waveform 301 with the various bits being designated as K, K+1, K+2, ... through K+11. Each data bit has an associated plurality of sample (S−) times representing each time the A/D converter 108 samples waveform 301 and generates an 8-bit binary word representing the amplitude of waveform 301 for each sample. On FIG. 3 the sample times are designated $S_{-1}$, $S_0$, $S_1$, ... through $S_{49}$. The horizontal lines above and below the center axis 302 are designated 303 and 304 and represent a threshold amplitude $V_{TT}$ and $-V_{TT}$ respectively. A bit, such as bit K+2, represents a binary 1 if the average of the waveform 301 for bit K+2 exceeds $V_{TT}$ or $-V_{TT}$. If the average is less than $V_{TT}$ or $-V_{TT}$, the bit represents a binary 0.

The A/D converter 108 samples analog input signal 301 a plurality of times for each bit. Thus, signal 301 is sampled at the times $S_{-1}$, $S_0$, $S_1$, $S_2$, $S_3$ and $S_4$ for bit K. At each sample time, the A/D converter generates a multibit binary number, such as an eight bit number, representing in binary form the sampled amplitude. Peak shift compensation circuit 111 receives each 8-bit word output of the A/D converter 108 for each data bit applied to path 102 and determines whether the K-bit represented by the plurality of 8-bit words represents a binary 1 or a 0. This is done by taking the average of four samples for each read data bit and determining whether or not the average of the samples exceeds $V_{TT}$. If the average of four samples exceeds $V_{TT}$ or $-V_{TT}$, the bit is considered to be a binary +1 or −1. If the amplitude is less than $V_{TT}$ or $-V_{TT}$, the bit is determined to be a 0.

Waveform 301 on FIG. 3 represents good data which is free of intersymbol interference or bit shifts. Under such conditions, compensation element 111 uses four adjacent samples for each read data bit and averages them to determine whether the read data bit represented by the samples is a binary 1 or 0. It is not adequate to determine the binary value of a read data bit by using a fixed set of four samples since misleading data would be generated if the samples represent a shifted binary 1. Therefore, in order to generate good data when a shifted binary 1 is received, the system of the present invention associates six different sample times with each read data bit to derive what is hereinafter termed an early, an on-time, and a late value for each read data bit. The four samples associated with the early value of bit K are $S_{-1}$, $S_0$, $S_1$, and $S_2$. The four samples associated with the on-time value of bit K are $S_0$ through $S_3$. The four sample times associated with the late value of bit K are samples $S_1$ through $S_4$. Each set of four samples is summed and divided by four to compute the average value of the set. For good data that does not represent a shifted binary 1, the averaged on-time value of each read data bit is used and is extended without modification to output path 112 and, in turn, to Read Data Detector 121.

The following equations 1 through 36 indicate the three different sets (early, on-time and late) of four samples associated with each received bit read data shown on FIG. 3.

$$V_k^E = \frac{S_{-1} + S_0 + S_1 + S_2}{4} \quad (1)$$

$$V_k^{OT} = \frac{S_0 + S_1 + S_2 + S_3}{4} \quad (2)$$

$$V_k^L = \frac{S_1 + S_2 + S_3 + S_4}{4} \quad (3)$$

$$V_{k+1}^E = \frac{S_3 + S_4 + S_5 = S_6}{4} \quad (4)$$

$$V_{k+1}^{OT} = \frac{S_4 + S_5 + S_6 + S_7}{4} \quad (5)$$

$$V_{k+1}^L = \frac{S_5 + S_6 + S_7 + S_8}{4} \quad (6)$$

$$V_{k+2}^E = \frac{S_7 + S_8 + S_9 + S_{10}}{4} \quad (7)$$

$$V_{k+2}^{OT} = \frac{S_8 + S_9 + S_{10} + S_{11}}{4} \quad (8)$$

$$V_{k+2}^L = \frac{S_9 + S_{10} + S_{11} + S_{12}}{4} \quad (9)$$

$$V_{k+3}^E = \frac{S_{11} + S_{12} + S_{13} + S_{14}}{4} \quad (10)$$

$$V_{k+3}^{OT} = \frac{S_{12} + S_{13} + S_{14} + S_{15}}{4} \quad (11)$$

$$V_{k+3}^L = \frac{S_{13} + S_{14} + S_{15} + S_{16}}{4} \quad (12)$$

$$V^E_{k+4} = \frac{S_{15} + S_{16} + S_{17} + S_{18}}{4} \quad (13)$$

$$V^{OT}_{k+4} = \frac{S_{16} + S_{17} + S_{18} + S_{19}}{4} \quad (14)$$

$$V^L_{k+4} = \frac{S_{17} + S_{18} + S_{19} + S_{20}}{4} \quad (15)$$

$$V^E_{k+5} = \frac{S_{19} + S_{20} + S_{21} + S_{22}}{4} \quad (16)$$

$$V^{OT}_{k+5} = \frac{S_{20} + S_{21} + S_{22} + S_{23}}{4} \quad (17)$$

$$V^L_{k+5} = \frac{S_{21} + S_{22} + S_{23} + S_{24}}{4} \quad (18)$$

$$V^E_{k+6} = \frac{S_{23} + S_{24} + S_{25} + S_{26}}{4} \quad (19)$$

$$V^{OT}_{k+6} = \frac{S_{24} + S_{25} + S_{26} + S_{27}}{4} \quad (20)$$

$$V^L_{k+6} = \frac{S_{25} + S_{26} + S_{27} + S_{28}}{4} \quad (21)$$

$$V^E_{k+7} = \frac{S_{27} + S_{28} + S_{29} + S_{30}}{4} \quad (22)$$

$$V^{OT}_{k+7} = \frac{S_{28} + S_{29} + S_{30} + S_{31}}{4} \quad (23)$$

$$V^L_{k+7} = \frac{S_{29} + S_{30} + S_{31} + S_{32}}{4} \quad (24)$$

$$V^E_{k+8} = \frac{S_{31} + S_{32} + S_{33} + S_{34}}{4} \quad (25)$$

$$V^{OT}_{k+8} = \frac{S_{32} + S_{33} + S_{34} + S_{35}}{4} \quad (26)$$

$$V^L_{k+8} = \frac{S_{33} + S_{34} + S_{35} + S_{36}}{4} \quad (27)$$

$$V^E_{k+9} = \frac{S_{35} + S_{36} + S_{37} + S_{38}}{4} \quad (28)$$

$$V^{OT}_{k+9} = \frac{S_{36} + S_{37} + S_{38} + S_{39}}{4} \quad (29)$$

$$V^L_{k+9} = \frac{S_{37} + S_{38} + S_{39} + S_{40}}{4} \quad (30)$$

$$V^E_{k+10} = \frac{S_{39} + S_{40} + S_{41} + S_{42}}{4} \quad (31)$$

$$V^{OT}_{k+10} = \frac{S_{40} + S_{41} + S_{42} + S_{43}}{4} \quad (32)$$

$$V^L_{k+10} = \frac{S_{41} + S_{42} + S_{43} + S_{44}}{4} \quad (33)$$

$$V^E_{k+11} = \frac{S_{43} + S_{44} + S_{45} + S_{46}}{4} \quad (34)$$

$$V^{OT}_{k+11} = \frac{S_{44} + S_{45} + S_{46} + S_{47}}{4} \quad (35)$$

$$V^L_{k+11} = \frac{S_{45} + S_{46} + S_{47} + S_{48}}{4} \quad (36)$$

As seen from equations 1–36, three sets of four different samples for each read data bit are summed and divided by four to compute the average early, on-time and late value of each read data bit. On FIG. 2, summer 201 receives four such successive samples on path 109, sums them and applies them over path 204 to divide by four element 203 which determines the average of the four successive samples. Thus, for bit K shown in FIG. 3, summer 201 receives the four different binary words generated by A/D converter 108 for the samples at times $S_{-1}$, $S_0$, $S_1$ and $S_2$, adds them and applies them to divider 203 which computes the average value of these four words to derive an averaged early value of bit K. This early value of bit K is extended over path 204 and entered into register 206 at time $t_1$. In a similar manner, the next set of four successive samples, $S_0$ through $S_3$, representing the on-time values of bit K, are summed by element 201, divided by four by element 203, extended over path 204 and entered into register 207 at time $t_2$. The late value of bit K is represented by samples $S_1$ through $S_4$ and is processed in a similar manner by elements 201 and 203 and entered into register 208 at time $t_3$.

VFO clock 118 controls the timing of system elements 114, 201, 203, and 236 by means of the signals it applies to path 113. VFO clock 118 (FIGS. 1 and 2) also applies a repetitive series of clock pulses to conductors $t_1$, $t_2$, $t_3$ and $t_4$ (FIG. 2) to enter data into the registers 206, 207 and 208 on FIG. 2. These clock signals also shift data to the right on FIG. 2 from one register to the next such as, for example, from register 206 to register 213 to register 221, etc.

The early values of received read data bits are entered into register 206 and then shifted to registers 213, 221 by subsequent $t_1$ pulses. The on-time values are entered into register 207 and then shifted to register 214 by $t_2$ pulses. The late values are entered by the $t_3$ pulses into register 208 and then shifted to registers 216 and 222. Registers 227 and 232 are activated by the $t_4$ pulses to receive the binary 8-bit value contained in a preceding register.

Figure 5:
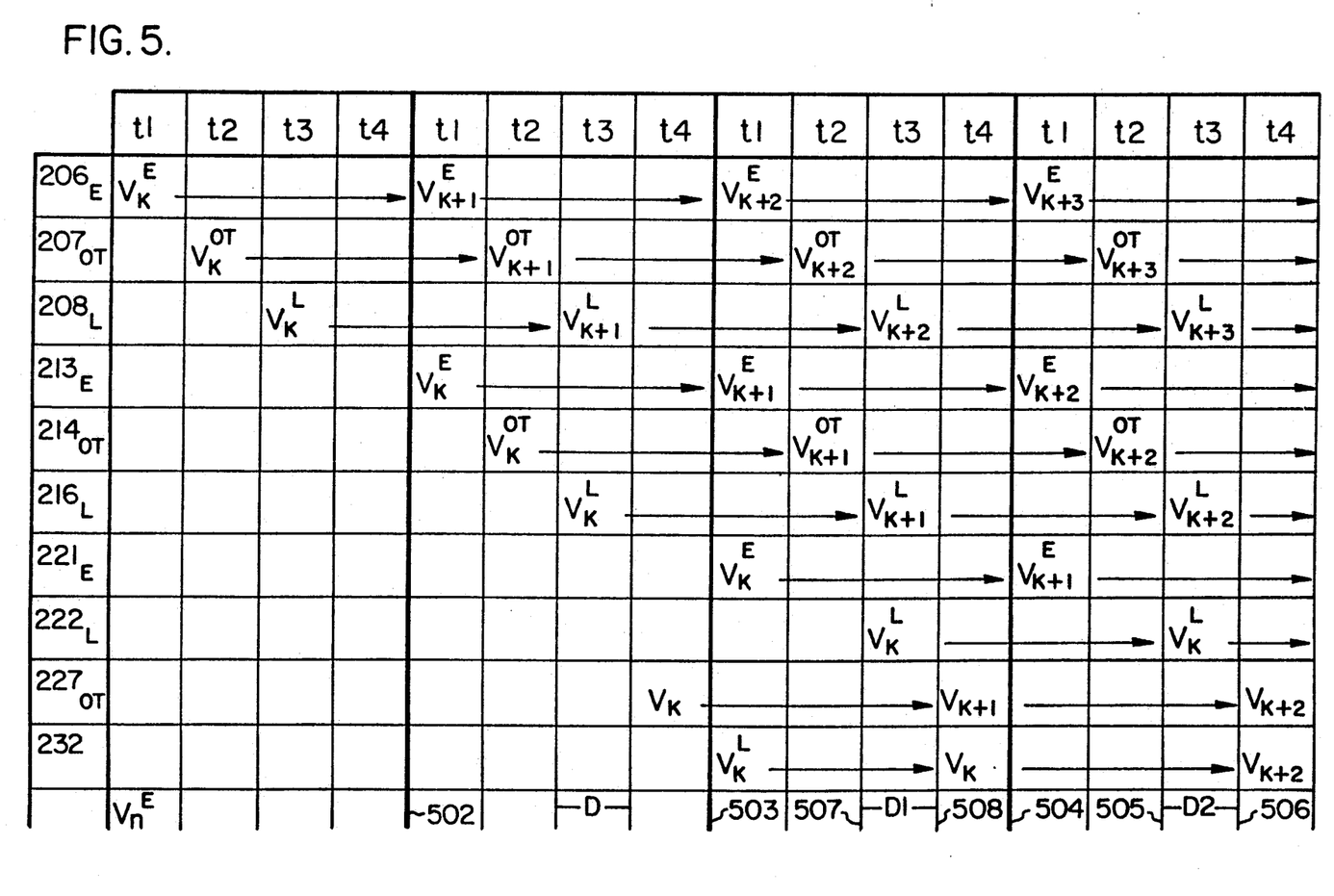
FIG. 5 specifies the contents of the registers of FIG. 2 at different times.

FIG. 2 shows the registers as already containing values of bits K, K+1, K+2 and K+3. The manner in which this particular sequence of bits is entered into the circuitry of FIG. 2 is described in the following paragraphs with reference to FIG. 5 which shows a plurality of repetitive series of clock pulse times $t_1$ through $t_4$ as different columns across the top row. The left-hand column of FIG. 5 shows the various registers of FIG. 2 that receive the early, on-time and late values of each read data bit. The following description describes how a sequence of read data bits K through K+3 is entered as binary words into the registers of FIG. 2. This description is simplified by assuming that the three values of a new read data bit K are initially applied over path 204 to registers 206, 207 and 208 and that the contents of the remaining registers to the right on FIG. 2 are initially of no consequence and they are therefore not described.

The operation begins at time $t_1$ of the first (left-most) sequence of clock pulses on FIG. 5. As shown on FIG. 5 and with reference to FIG. 2, at pulse time $t_1$, divider 203 applies signal $V^E_k$ (an 8-bit word) representing the averaged early value of bit K to path 204. This signal is entered by pulse $t_1$ into register 206. In the same manner, at pulse times $t_2$ and $t_3$, the averaged on-time and late values of the bit K are entered as 8-bit words into registers 207 and 208, respectively. Registers 227 and 232 receive clock signals at time $t_4$, but their operation at this time is of no interest to the present description.

At the end of the first series of clock pulses $t_1$ through $t_4$, registers 206, 207 and 208 contain the early, on-time and late values of bit K. This is shown on FIG. 5 in the rows associated with registers 206, 207 and 208 and in the columns of these rows associated with the first (leftmost) sequence of timing pulses $t_1$ through $t_4$. This first time sequence ends with vertical line 502.

After line 502, the VFO clock 118 generates another sequence of clock pulses $t_1$ through $t_4$ which shift the current contents of registers 206, 207 and 208 to the right on FIG. 2 and enter them into registers 213, 214 and 216. At the same time, registers 206, 207 and 208 receive the early, the on-time, and the late values of read data bit K+1. The second $t_3$ clock pulse enters the late value of bit K into register 216 and the next clock pulse, clock pulse $t_4$, enters a value of bit K into register 227. The value of bit K that is entered into register 227 by this second clock pulse $t_4$ depends upon the operative position of multiplexer 224. The value of bit K entered into register 227 at this time $t_4$ may either be the early value of bit K from register 213, the on-time value of bit K from register 214 or the late value of bit K from register 216. The operation of multiplexer 224 is subsequently described in detail. With reference to FIG. 5, at the end of the second series of $t_1$ through $t_4$ clock pulses at vertical line 503, registers 206, 207, 208 contain the early, on-time, and late values of bit K+1 while registers 213, 214, 216 contain the three different values of bit K. Register 227 contains one of the three possible values of bit K as determined by the position of multiplexer 224. The particular value of bit K that it now contains at this time is of no importance to the present description.

The third cycle of clock pulses $t_1$ through $t_4$ begins immediately to the right of the vertical line 503. The early value of bit K+2 is entered into register 206 at $t_1$ and, simultaneously the early value of bit K+1 in register 206 is shifted to register 213 and the early value of bit K in register 213 is shifted to register 221. The next clock pulse appears at time $t_2$ during which register 207 receives the on-time value of bit K+2 and register 214 receives from register 207 the on-time value of bit K+1. The next clock pulse appears at time $t_3$ during which, as shown on FIG. 5, register 208 receives the late value of bit K+2, register 216 receives the late value of bit K+1 while register 222 receives the late value of bit K.

The next clock pulse appears at time $t_4$ during which registers 227 and 232 receive the values of bit K+1 and K, respectively, as determined by the settings of multiplexers 224 and 229. Register 227 receives either the early value of bit K+1 from register 213, the on-time value of bit K+1 from register 214 or the late value of bit VK+1 from register 216. The specific value entered into register 227 at this time is not material to the present description. Similarly, register 232 receives either the early value of bit K from register 221, the value of bit K that was in register 227 or the late value of bit K from register 222. The value of bit K entered into register 232 at this time is determined by the operational position of multiplexer 229. The specific value of bit K entered into register 232 at this time is immaterial to the present description.

The fourth cycle of clock pulses begins immediately to the right of vertical line 504. At time $t_1$, register 206 receives the early value of bit K+3, register 213 receives from register 206 the early value of bit K+2 while register 221 receives the early value of bit K+1 from register 213. At time $t_2$, register 207 receives the on-time value of bit K+3 and register 214 receives the on-time value of bit K+2. At time $t_3$ register 208 receives the late value of bit K+3, register 216 receives the late value of bit K+2 and register 222 receives the late value of bit K+1.

During the interval D2 between $t_3$ and $t_4$ (lines 505 and 506), post compensation logic element 236 analyzes the information currently stored in the registers of FIG. 2. With reference to FIG. 5, it can be seen that the during interval D2 (between lines 505 and 506) the registers of FIG. 5 store the information required by logic element 236 to determine whether or not the data now in the on-time registers (207, 214, 227, 232) represents good data or, alternatively, corrupted data that may possibly represent a shifted read data bit of 1. During this interval D2, it can be seen that registers 206, 207, 208 store information pertaining to bit K+3; that registers 213, 214 and 216 store information pertaining to bit K+2; that registers 221, 227 and 222 store information pertaining to bit K+1; and that register 232 stores information pertaining to bit K.

Logic element 236 looks at the on-time values of these four read data bits to determine whether the sequence represents good data or data that possibly is corrupted by a shifted binary 1. In order to perform this function, logic element 236 looks at the values of the bits in registers 207, 214, 227 and 232 to determine whether or not the data bit sequence is valid or corrupted by a shifted binary 1.

Logic element 236 is connected to the output of register 207 over path 211, to the output of multiplexer 224 over path 226, to the output of multiplexer 229 over path 231 and to the output of register 232 over path 112. Multiplexers 224 and 229 are initially set to their middle position to interconnect paths 218 and 226 as well as paths 230 and 231. The contents of register 214 are applied over paths 218 and 226 to logic element 236. The contents of register 227 are applied over paths 230 and 231 to logic element 236. If the data bit sequence now stored in registers 207, 214, 227 and 232 appears valid, logic element 236 leaves the multiplexers 224 and 229 in the position in which their center input is connected is signalwise with their output. Under this condition, the 8-bit word in register 232 is subsequently applied out over path 112 to utilization means 121 shown on FIG. 1. The circuitry of FIG. 3 next receives the three values of bit K+4 and analyzes the validity of the on-time values of the data bit sequence K+1 ... K+4.

The data bit sequence represented by the contents of registers 207, 214, 227 and 232 (for the data bit sequence K ... K+3) may sometimes be invalid because of a possible shift of either bit K+2 or bit K+1. If shifted data bit is associated with the K+2 bit, multiplexers 224 and 229 function to substitute either the early value from registers 213 and 221 or the late value from registers 216 and 222 in place of the on-time value of bits K+1 and K+2 in registers 227 and 214. Multiplexers 224 and 229 operate under control of signals applied to paths 233 and 234 to switch to the operative position associated with the register that is to be used to supply the early or the late values of bit K+2 and bit K+1.

Let it be assumed, for example, that a ∅ for bit K+1 has been corrupted by an early shift of a 1 for bit K+2. Such a pattern may then be represented as ∅+1 +1 −1 or ∅−1 −1 +1. The correct pattern is either ∅ ∅+1 −1 or ∅ ∅−1 +1. The presence of two consecutive ones of the same polarity may represent an early data bit shift. Assume the contents of register 207 represent a −1, the contents of register 214 represent a +1, the contents of register 227 represent a and the contents of register 232 represent a ∅. In this case, logic element 236 determines that the +1 for bit K+1 in register 227 may represent an early shift of bit K+2 and alters the operative position of multiplexers 224 and 229 over paths 233 and 234 so as to connect the output of register 213 over path 217 to the output 226 of multiplexer 224 and to connect register 221 over path 223 to the output 231 of multiplexer 229. This changes the operative positions of multiplexers 224 and 229 and substitutes the early values of bit K+2 and K+1 for the on-time values of bit K+2 and K+1 in register 214 and 227. This early value of the K+2 bit in register 213 is assumed to be a 1. This is the value that is now applied over path 217 via multiplexer 224 to the input of register 227. This value is shifted into register 227 at the beginning of the next $t_4$ time (line 506). The early value of bit K+1 in register 221 is applied by multiplexer 229 to register 232 at time $t_4$. This provides the correct sequence of ∅ ∅ +1 −1 at time $t_4$ to registers 232, 227, 214 and 207.

The value of the on-time bits in registers 207, 214, 227 and 232 may sometimes represent a late data bit shift which may have a data bit pattern of either −1 +1 +1 ∅ or +1 −1 −1 ∅. The correct patterns are −1 +1 ∅ or +1 −1 ∅ ∅. It is the third data bit of ∅ that is corrupted by a late shift of the second data bit of 1.

Let it be assumed that the corrupted shifted data bit pattern is −1 +1 +1 ∅. The +1 for data bit K+2 in register 227 represents defective data and logic circuit 236 alters the operative position of multiplexers 224 and 229 to interconnect register 222 via path 228 through multiplexer 229 with path 231 and register 232. Multiplexer 224 now connects register 216 to path 226 and register 227. This substitutes the late value of data bit K+1 in register 222 for the on-time value of data bit K+1 in register 227. This effectively transforms the four bits from the erroneous sequence of −1 +1 +1 ∅ to correct sequence of −1 +1 ∅ ∅.

In partial summary, the four-bit sequence in registers 207, 214, 227 and 232 may represent either good data, data in which the second data bit i.e., bit K+1 in register 227 is corrupted by an early data bit shift or corrupted data signifying a late shift of the third bit K+2 in register 214. In this case the corruption contaminates a valid ∅. The data bit value in register 214 is either a +1 or a −1 depending upon the nature of the data bit shift.

Logic element 236 analyzes the last three data bits in registers 207, 214 and 227 and if the data therein is not corrupted, it leaves the multiplexers 224 and 229 in their operative position wherein their middle input is connected signalwise with their output. In this case, the on-time values of the second and third bits stored in registers 227 and 214 are left unchanged. On the other hand, if logic element 236 determines that the data in registers 207, 214, 227 and 232 may represent an early bit shift, it knows that the value of the second data bit of the sequence namely the bit K+1 in register 227 is corrupted and must be changed by replacing it with the early value of K+1 bit stored in register 221. It changes the operative position of multiplexers 229 and 224 so that the upper input on path 223 is now connected signalwise to the output of the multiplexer 229 on path 231. The multiplexers operate similarly for late data bit shifts. They effectively substitutes the late value of bit K+1 and K+2 in registers 222 and 216 for the on-time value of these bits in registers 227 and 232.

Alternatively, logic element 236 may determine that the third bit (K+2) of the sequence, stored in register 214 is corrupted by a possible late shift. The ∅ that should be in register 214 at this time for bit K+2 is corrupted by either a +1 or −1. Logic element alters the operative position of multiplexers 224 and 229 so that the late value of the K+2 bit in register 216 is substituted for the corrupted on-time value of the data bit in register 214. The late value of bit K+2 stored in register 216 is replaced with the corrupted on-time value of bit K+2 stored in register 214. The late value of bit K+1 from register 222 is also selected by multiplexer 229 for use by register 232.

It can be seen that the circuitry of FIG. 2 operates under control of the logic element 236 and analyzes the state of each four-bit sequence stored in on-time registers 207, 214, 227 and 232. It uses the contents of these four registers if no corrupted data bit pattern is detected. If a corrupted data bit pattern is detected that may represent either an early or a late bit shift of the second or third data bit of the sequence, element 236 alters the operative position of multiplexers 224 and 229 to substitute either the early or the late value of the second and third bits for the corrupted on-time value of the bits stored in registers 214 or 227 depending upon the nature of the data bit shift.

Description of FIG. 3

FIG. 3 illustrates the waveforms associated with the reception of valid data. The center axis is designated as line 302, the upper threshold of $V_{TT}$ is designated as 303 and the lower threshold of $-V_{TT}$ is designated as 304. Waveform 301 varies in amplitude around the center axis 302. This waveform 301 represents the input signal 107 received by the A/D converter 108. Waveform 301 is shown as having 12 successive bits designated K through K+11. Waveform 301 is sampled by A to D converter 108 at the times associated with the black dots on FIG. 3. These black dots represent sampling times and are designated $S_{-1}$, $S_0$, $S_1$, through $S_{49}$. This repeated sampling of waveform 301 permits the circuitry of the present invention to compute an early value of each bit, an on-time value of each data bit and a late value of each K-bit. This is done by sampling each data bit four different times for each of its three different values. The circuitry of FIG. 2 sums each different set of four successive samples and divides them by four to derive an average (in an 8-bit word format) representing the early, on-time and late value of each bit. An average value of four successive samples represents a binary 1 if it exceeds the threshold of either $V_{TT}$ or $-V_{TT}$. An averaged value of four successive samples represents a read data bit of ∅ if it does not exceed the $V_{TT}$ or $-V_{TT}$ threshold value. Equations 1-36, supra, identify the four sampling times for the early, on-time, and late values of each data bit K-K+11.

Figure 4:
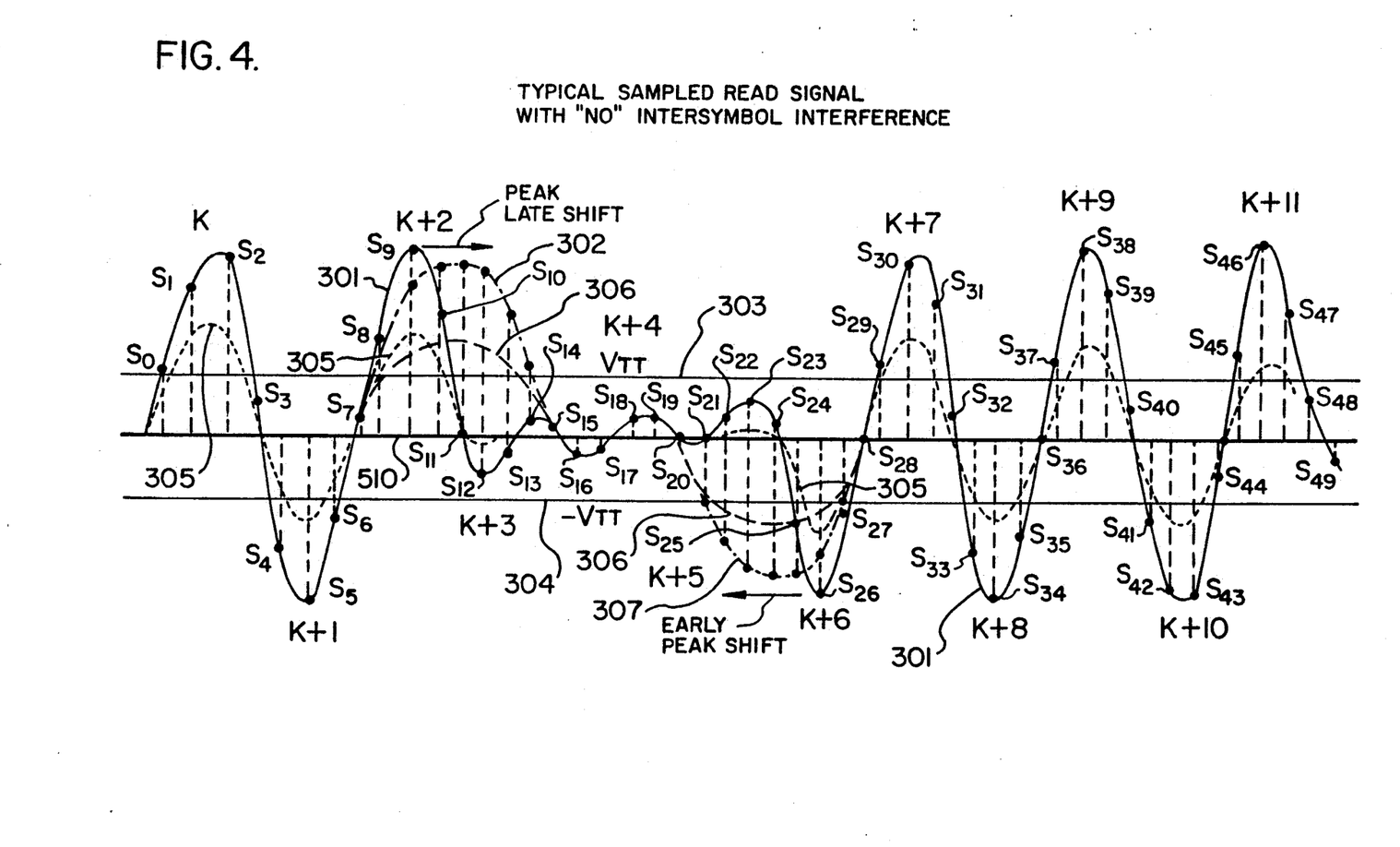
FIG. 4 is an illustrative wave form of signal received by the peak shift post-compensation circuit under conditions in which both late and early peak shifts are present in the received data signals.

Description of FIG. 4

FIG. 4 illustrates waveform 301 for valid data, waveform 302 for corrupted data representing a late peak shift and waveform 307 for corrupted data representing an early peak data bit shift. Waveform 301 of FIG. 4 is the same as that of FIG. 3 and represents the input signal 107 received by A/D converter 108. Waveform 305 represents the average value of peak waveform 301 without delay due to the average function.

Waveforms 301 and 305 represent data that is not corrupted by a data bit shift. Bit K represents a binary +1, bit K+1 a −1 and bit K+2 a +1. Bits K+3, K+4 and K+5 represent ∅s since their amplitudes are less than the thresholds $V_{TT}$ and $-V_{TT}$.

Waveform 302 portrays a late peak shift of bit K+2. This waveform 302 begins approximately at sampling time $S_7$, continues to rise through sampling times $S_8$ and $S_9$, reaches a peak at approximately sampling times $S_{10}$, $S_{11}$ and $S_{12}$, declines at sampling times $S_{13}$ and $S_{14}$ and approaches zero at sampling time $S_{15}$. This waveform 302 represents a late peak shift of the binary 1 for bit K+2. The average of this shifted waveform 302 is shown by waveform 306. Waveform 306 correctly represents a +1 for bit K+2 but extends into the sampling times for bit K+3 to corrupt the ∅ value of bit K+3. Waveform 306 indicates an erroneous value of +1 for bit K+3 for sampling times $S_{11}$, $S_{12}$, $S_{13}$ and $S_{14}$.

The circuitry of FIG. 2 alters the position of multiplexers 224 and 229 to select the late value of bits K+2 and K+3 for shifted waveforms 302 and 306. From equation 12, this late sample for bit K+3 is taken at sampling times $S_{13}$, $S_{14}$, $S_{15}$ and $S_{16}$ which are summed together and divided by four. The computed late value of bit K+3 is less than the threshold $V_{TT}$ and therefore a binary ∅. In this case, bit K+3 is the third data bit in the four bit sequence with the first bit being K+1, the second bit being K+2, the third being K+3 and the fourth being bit K+4. Thus, the circuitry of the present invention compensates for the late peak shift represented by a corrupted sequence of −1 +1 +1 ∅ and converts it into a correct sequence −1 +1 ∅ ∅ by using the late value of bits K+2 and K+3 rather than the on-time value of bits K+2 and K+3.

Consider the four-bit sequence of ∅ ∅ −1 +1 for bits K+4, K+5, K+6 and K+7 as correctly represented by waveforms 301 and 305. FIG. 4 portrays how the peak waveform 301 is shifted to the left by waveform 307 to corrupt the ∅ value of bit K+5 so that its on-time value is a −1 rather than ∅. Waveform 306 is the average of waveform 307 for bit K+5. This results in a corrupted four-bit sequence of ∅, −1, −1, +1. When this corrupted sequence is received and processed by the circuitry of FIG. 2, bit K+4 is the first data bit of the sequence and is stored in register 232 as a zero. Registers 221, 227 and 222 store the early, on-time and late values of bit K+5. Bit K+6 is the third data bit in the sequence and its three values are respectively stored in registers 213, 214, and 216. The last data bit in the sequence is bit K+7 and its three values are stored in registers 206, 207 and 208. The on-time values of this corrupted sequence are ∅, −1, −1, +1. The circuitry of the present invention corrects this corrupted sequence by substituting the early value of bit K+5 stored in register 221 for the on-time value stored in register 227. This is accomplished as logic element 236 alters the conductive state of multiplexer 229 to connect the output of register 221 on path 223 to the output of the multiplexer on path 231 in place of the output of register 227. The early value of bit K+5, as shown in equation 16, supra, is computed by adding samples $S_{19}$, $S_{20}$, $S_{21}$ and $S_{22}$ and then dividing them by four to indicate a binary value of ∅. This value is used rather than the binary value −1 represented by the on-time values of bit K+5 as portrayed by the samples of times $S_{20}$ through $S_{23}$ for equation 17, supra. Thus, the circuitry of the present invention changes the corrupted data bit sequence of ∅ −1 −1 +1 to its correct value of ∅ ∅ −1 +1.

Figures 6, 7:
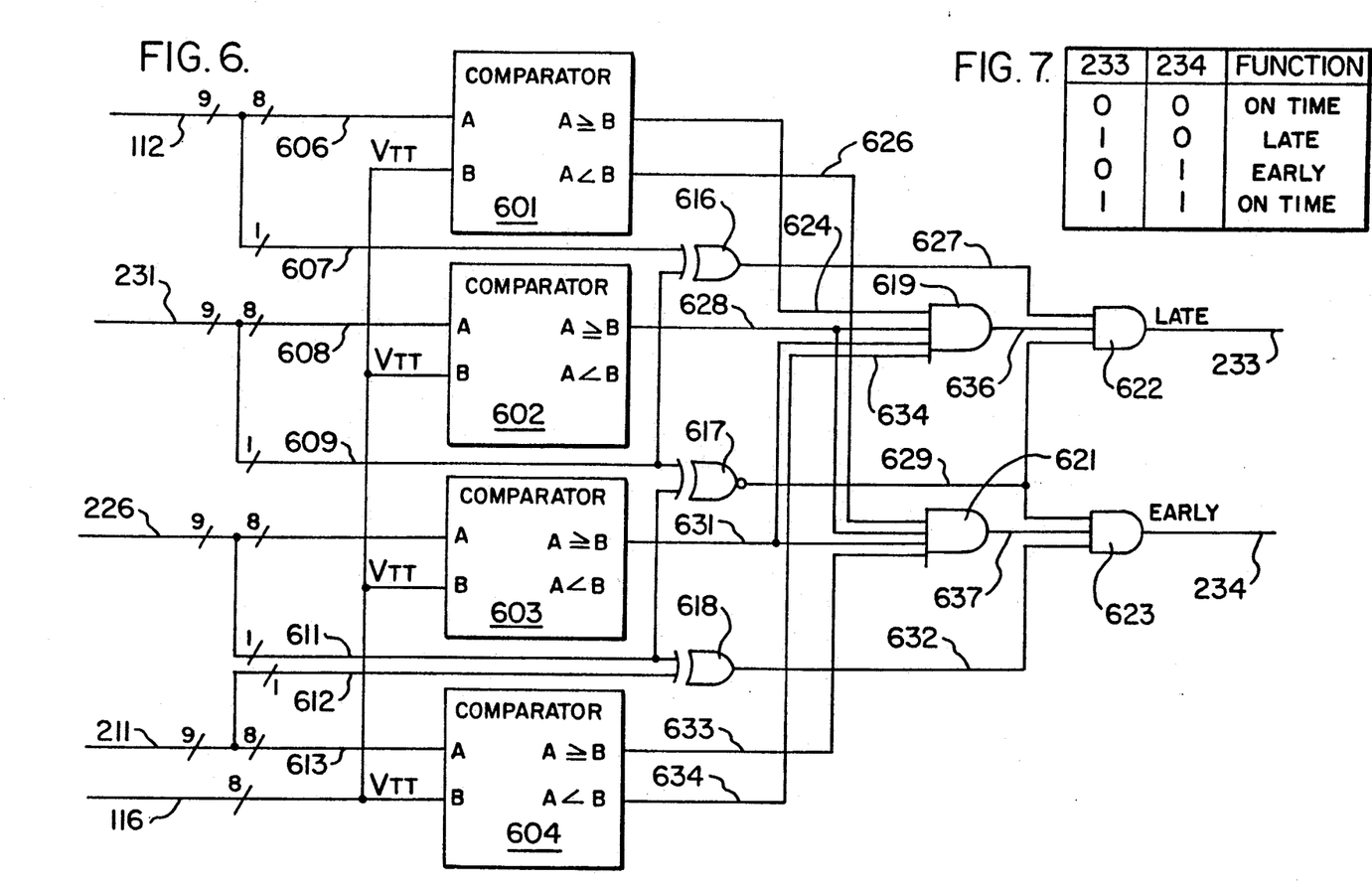
FIGS. 6 and 7 disclose further details of the Post Compensation Logic element 236 of FIG. 2.

Description of FIGS. 6 and 7

FIG. 6 discloses further details of the post-compensation logic element 236 of FIG. 2. The function of element 236 on FIG. 2 is to analyze the registered 8-bit digital words representing the amplitude of the signal for data bits K, K+1, K+2 and K+3 of a given four-bit sequence and to determine whether this four-bit sequence appears to represent valid data or, alternatively, whether it represents data that has been corrupted by a peak shift of a signal for an adjacent 1. Logic element 236 monitors the four registered data bits of a sequence over conductors 112, 231, 226, and 211 and, in response thereto, determines whether the monitored four-bit sequence appears to represent good data for which the on-time registered amplitude values may be used or, alternatively, whether the four bits comprise a sequence that has been corrupted by a bit shift of an adjacent 1. In this case, the early or late value of the amplitude of the corrupted bit is used in place of its on-time amplitude.

As previously described, multiplexers 224 and 229 control which value of the K+1 and K+2 bits of a four-bit sequence are to be used. This determination is made by the signals applied over conductors 233 and 234 which control the multiplexer input that is to be connected signalwise to its output.

FIG. 6 discloses further details of post-compensation logic element 236. Input conductors 112, 231, 226, and 211 are shown on the left extending to the four comparators 601, 602, 603 and 604. Each set of input conductors such as, for example, input conductors 112, comprises nine separate conductors which carry a 9-bit signal. These nine bits are extended from an associated register on FIG. 2 to the circuitry shown on FIG. 6. Conductor path 112, for example, extends nine bits from register 232 on FIG. 2 with eight of the bits representing the binary value of the signal amplitude representing a stored data bit and with the ninth bit representing the sign value such as + or − of the 8-bit word. On FIG. 6, path 112 divides into an eight-bit path 606 which extends to the upper input of comparator 601. It also divides into a 1-bit path 607 which extends to the upper input of a NOR-gate 616. The one bit on path 607 represents the sign, such as + or −, of the 8-bit binary word on path 606. The same relationship applies to the input conductor paths 231, 226 and 211, each of which extends a 8-bit signal from an associated register on FIG. 2 to a comparator and a 1-bit signal to one of gates 616, 617 and 618 on FIG. 6.

The threshold potential $V_{TT}$ is applied as an 8-bit word over conductor 116 to the lower input of each comparator 601–604. Each comparator compares the binary value of the threshold potential $V_{TT}$ with the binary value of the 8-bit word applied to its upper input. The upper output of a comparator is true (high) whenever the value of the signal on its upper input is equal to or exceeds the value of the $V_{TT}$ signal applied to its lower input. The lower output of a comparator is high if the signal value on the upper input is less than on its lower input. Gates 616, 617, and 618 receive the sign (+ or −) of the ninth bit of the signal applied to conductors 112, 231, 226, and 211. AND gates 619 and 621 receive the outputs of the four comparators 601 through 604. AND gates 622 and 623 receive the outputs of gates 616, 617, 618, 619 and 621 and generate the signals that control the operative state of the multiplexers 224 and 229.

FIG. 7 shows the truth table for AND gates 622 and 623. From FIG. 7 it can be seen that the on-time value of a stored K+1 and K+2 data bit in the registers of FIG. 2 is used if both of AND gates 622 and 623 are either on or off. It can further be seen that the late value of a registered K+1 and K+2 bit is used when AND gate 622 is on. In this case, path 233 is true and path 234 is ∅. The early value of a stored K+1 and K+2 bit is used when the signal 233 is ∅ while the signal 234 from gate 623 is true.

AND gate 621 has all of its inputs true when a four-bit sequence, beginning with bit K, comprises a ∅1 1 1. Under such conditions, all the inputs of the gate 621 are true so that the gate turns on and drives its output 637 true extending to the middle input of AND gate 623. Gate 621 turns on under such conditions without regard to the sign of any of the four bits in the sequence. The sequence of ∅1 1 1 may or may not represent logical data depending upon the sign of the 1 bits of the sequence. Thus, the sequence may represent good data if it comprises ∅−1 +1 −1. The sequence represents bad data if it comprises ∅−1 −1 +1. In this case, the second bit of the sequence, namely the first −1, may represent a corrupted bit caused by an early shift of the second −1. For this defective sequence of ∅−1 −1 +1, conductor 612 extends a true signal representing a ∅ sign bit from path 211 to the lower input of gate 618. Conductor 611 extending to the upper input of NOR-gate 618 is a low representing the negative value of the −1 signal on path 226. With only one of its inputs high, NOR-gate 618 turns on and drives its output on path 232 high extending to the lower input of AND gate 623. The low signal on path 611 also extends to the lower input of inverting NOR-gate 617. The upper input of this inverting NOR-gate receives a low signal on path 609 representing a negative value of the 9-bit word on the path 231. At this time, both of the inputs of inverting NOR-gate 617 are low. This causes the inverting output of the gate on path 629 to apply a high to the upper input of AND gate 623. All inputs of AND gate 623 are now high so that the gate turns on and applies a high to path 234 to cause multiplexers 224 and 229 to select the early value, rather than the on-time values, for bits K+1 and K+2 from register 221 and 213 on FIG. 2.

From the above, AND gate 623 turns on and selects the early value of the K+1 and K+2 bits when AND gate 621 detects a sequence of ∅1 1 1 that represents data that may be corrupted due to an early bit shift. This has been described for the sequence of ∅−1 −1 +1. The circuitry of FIG. 6 operates in a similar manner if a defective sequence of ∅+1 +1 −1 is detected. On the other hand, for sequences representing valid data, such as ∅−1 +1 −1, AND gate 623 does not turn on and the on-time values of each data bit in the 4-bit sequence are used.

In an analogous manner, AND gate 619 detects a bit sequence of 1 1 1 ∅ which may or may not represent good data depending upon the sign of the binary 1s in the sequence. If the sequence represents valid data, such as +1 −1 +1 ∅, the circuitry of FIG. 6 selects the on-time values of bits K+1 and bits K+2. On the other hand, for a defective sequence such as +1 −1 −1 ∅, the circuitry is activated to turn on AND gate 622 so that a high is applied to conductor 233. This high is applied to multiplexers 224 and 229 so that the late value, rather than the on-time value, of bits K+1 and K+2 is used. Under such conditions, gate 619 has all of its inputs high so that the gate turns on and applies a high to the middle input of AND gate 622. NOR-gate 616 has only one of its inputs high, namely its upper input, so that its output 627 becomes high and extends a high to the upper input of AND gate 622. The lower input of AND gate 622 is also high at this time from the inverting output of NOR-gate 617 which receives a −1 on both of its inputs and does not turn on. This holds its output high.

In the above manner, the circuitry of FIG. 6 detects the occurrence of specific bit patterns of four-bit data sequences wherein the specific bit patterns may represent corrupted data. The NOR-gates 616 through 618 analyze the signs of the bits of the sequence to determine whether the sequence is good or bad and to determine whether possible data corruption may have occurred due to either an early or a late shift of either the second or the third data bits of the sequence.

Theory of Operation of Logic Element 236 to Effect Post Bit Shift Compensation of a Four-Bit Sequence Let:

$V_{TT}$ = Amplitude Threshold used for qualifying Peaks $V_n$ = Amplitude of the $n^{th}$ bit $V_n^L$ = Amplitude of the LATE $n$th bit $V_n^{OT}$ = Amplitude of the ON-TIME $n^{th}$ bit $V_n^E$ = Amplitude of the EARLY $n^{th}$ bit Condition 1.

Detection and verification of an early bit shift:
The received pattern without bit shift is:
$V_n V_{n+1} V_{n+2} V_{n+3}$: $\phi \phi +1 -1$ or $\phi \phi -1 +1$
If an early bit shift occurs, the received pattern is:
$V_n V_{n+1} V_{n+2} V_{n+3}$: $\phi +1 +1 -1$ or $\phi -1 -1 +1$
An early shift has occurred if all of the following conditions are met:
a. $V_n < V_{TT}$
b. $V_{n+1} \geq V_{TT}$, $V_{n+2} \geq V_{TT}$, $V_{n+3} \geq V_{TT}$
c. $\text{sign}(V_{n+1}) = \text{sign}(V_{n+2})$, $\text{sign}(V_{n+2}) \neq \text{sign}(V_{n+3})$
The magnitude of the bits $V_{n+1}$, $V_{n+2}$ in the received pattern are then corrected as:
$V_{n+1} = V_{n+1}^E$, $V_{n+2} = V_{n+2}^E$ Condition 2.

Detection and verification of a late bit shift:
The received pattern without bit shift is:
$V_n V_{n+1} V_{n+2} V_{n+3}$: $-1 +1 \phi \phi$ or $+1 -1 \phi \phi$
If a late bit shift occurs, the received pattern is:
$V_n V_{n+1} V_{n+2} V_{n+3}$: $-1 +1 +1 \phi$ or $+1 -1 -1 \phi$
A late shift has occurred if all of the following conditions are met:
a. $V_n \geq V_{TT}$, $V_{n+1} \geq V_{TT}$, $V_{n+2} \geq V_{TT}$
b. $V_{n+3} < V_{TT}$
c. $\text{sign}(V_{n+1}) = \text{sign}(V_{n+2})$, $\text{sign}(V_n) \neq \text{sign}(V_{n+1})$
The magnitude of the bits $V_{n+1}$, $V_{n+2}$ in the received pattern are then corrected as:
$V_{n+1} = V_{n+1}^L$, $V_{n+2} = V_{n+2}^L$ Condition 3.

This third condition is true indicating that no bit shift has occurred whenever conditions 1 and 2 above are false. The on-time magnitudes of $V_{n+1}$ and $V_{n+2}$ are then used:
$V_{n+1} = V_{n+1}^{OT}$, $V_{n+2} = V_{n+2}^{OT}$
Note: $V_n$ is the first time data bit value into the sampled data prequalifier/post-compensation circuit.

The preceding has described how the circuitry of the present invention operates to correct a four-data bit sequence that is corrupted by an early or late shift of the second or third bits of the sequence. The present invention can also correct for shifts or corrupted three-data bit sequence. A valid three-data bit sequence of ∅ +1 −1 may be corrupted by an early data bit shift so that it appears as +1 +1 −1. A valid three-data bit sequence of ∅−1 +1 may be corrupted by an early data bit shift so that it appears as −1 −1 +1. The valid three-data bit sequence of +1 ∅ ∅ may be corrupted by a late data bit shift to appear as a +1 +1 ∅. The valid three-data bit sequence of −1 ∅ ∅ may be corrupted by a late data bit shift and appear as −1 −1 518 .

Consider the three-data bit sequence on FIG. 4 of K+4, K+5 and K+6. The correct value of this sequence as indicated by waveform 301 is ∅ ∅ −1, but the sequence when corrupted by an early peak shift is represented by waveform 307 and appears as a ∅ −1 −1. Similarly, consider the three-data bit sequence of K+1, K+2 and K+3. The correct binary value of this sequence is −1 +1 ∅. This is represented by waveform 301. Waveform 302 represents a late peak shift of data bit K+2 where bit K+3 is corrupted and the sequence appears as −1 +1 +1.

The circuitry and apparatus of the present invention corrects the above-described three-data bit sequence by operating the circuitry of FIG. 2 in a manner similar to that of a four-data bit sequence.

The above disclosure sets forth one possible embodiment of the present invention. Other arrangements or embodiments, not precisely set forth, such as a three-data bit sequence, or a five- or more-data bit sequence, could be practiced under the teachings of the present invention and as set forth in the following claims.

We claim:

1. A method of correcting timewise peak data bit shifts in data sequences each comprising a plurality of data bits wherein a binary ∅ of a sequence is represented by an analog signal peak having an amplitude less than a threshold value and a binary 1 of a sequence is represented by an analog signal peak having an amplitude equal to or greater than said threshold value, said method comprising the steps of:

receiving analog signals representing the data bits of a sequence;

sampling each received signal a plurality of times;

in response to said sampling, generating a first and at least a second derived value of the signal amplitude for each data bit of said sequence;

analyzing said first derived value of the signal amplitude for each data bit of said sequence to determined whether said sequence as characterized by said first derived value for each data bit represents logical data;

applying said first derived value of each data bit of said sequence to an output for use by utilization means if the data bits of said sequence appear to represent logical data;

determining that said sequence contains a ∅ whose analog signal has been corrupted by a timewise peak data bit shift of an analog signal representing an adjacent 1;

substituting said at least second derived value of said signal amplitude of said corrupted ∅ in place of said first derived value of said signal amplitude of said corrupted ∅ to form a corrected data bit sequence representing logical data; and applying said corrected sequence to said output for use by said utilization means.

2. The method of claim 1 wherein said steps of receiving and sampling and generating comprises the steps of:

reading said analog signals representing each data bit of a sequence from a storage medium;

applying said analog signals representing each read data bit to an analog to digital (A/D) converter;

operating said A/D converter at a plurality of sample times for the analog signal representing each read data bit to generate a corresponding plurality of multibit binary words each of which represents the amplitude of said analog signal of said represented read data bit at each of said sample times;

applying a plurality of different subsets of n of said binary words representing the analog signal amplitude of each read data bit at different sample times to an averaging means to derive an average signal amplitude of said binary words of each subset;

storing said averaged signal amplitude of each subset of binary words in different registers; and wherein said step of analyzing comprises the step of analyzing the contents of said registers to determine whether the read data bits of a sequence represent logical data.

3. The method of claim 2 wherein said plurality of said subsets of binary words of each read data bit together represent an on-time and an early and a late value of the analog signal amplitude of each said read data bit, and wherein said steps of determining and substituting comprise the steps of:

determining whether the on-time signal value of a ∅ in said sequence has been corrupted by an early or a late peak signal shift of an adjacent 1;

substituting an early signal value for said corrupted ∅ in place of said on-time signal value if said corruption is caused by an early peak signal shift of a signal representing an adjacent 1; and substituting a late signal value for said corrupted ∅ in place of said on-time signal value if said corruption is caused by a late peak signal shift of a signal representing an adjacent 1.

4. The method of claim 3 wherein said early, and on-time, and late signal values of said read data bits of said sequence are stored in different registers of different register stages each of which is unique to a different data bit of said sequence;

and wherein said registers are operated to bypass a register containing a corrupted on-time signal value of ∅ to substitute the early or late signal value of the data bit stored in another register as a replacement of said corrupted on-time signal value of ∅.

5. A method of correcting timewise peak data bit shifts in data sequences each comprising a plurality of data bits wherein a binary ∅ of a sequence is represented by an analog signal peak having an amplitude less than a threshold value and a binary 1 of a sequence is represented by a signal peak having an amplitude equal to or greater than said threshold value, said method comprising the steps of:

receiving analog signals representing the data bits of a sequence from a storage medium;

sampling each received signal a plurality of times;

in response to said sampling, deriving an on-time value of the amplitude of a sampled signal for each data bit in said sequence;

in response to said sampling, deriving an early value of said amplitude of said sampled signal for each data bit in said sequence;

in response to said sampling, deriving a late value of said amplitude of said sampled signal for each data bit of said sequence;

analyzing said on-time signal values for the data bits of said sequence to determine whether said sequence represents logical data;

applying said sequence to an output for use by utilization means if said sequence is determined to represent logical data;

determining that said sequence contains a 0 whose on-time signal has been corrupted by a timewise peak data bit of a signal representing an adjacent 1;

substituting a said early signal value of said corrupted 0 in place of said on-time value of said corrupted 0 to form a corrected data bit sequence representing logical data when said corrupted 0 is due to an early peak signal shift of a signal representing an adjacent 1;

substituting said late signal value of said corrupted 0 in place of said on-time value of said corrupted 0 to form a corrected data bit sequence when said corrupted 0 is due to a late peak signal shift of an adjacent 1; and applying said corrected sequence to said output for use by said utilization means.

6. The method of claim 5 wherein said step of receiving and sampling said data bits comprises the steps of:

reading an analog signal representing each data bit of a sequence from said storage medium;

applying said analog signal representing each read data bit to an analog to digital (A/D) converter;

operating said A/D converter at a plurality of sample times for each read data bit to generate a corresponding plurality of multibit binary words representing the amplitude of said analog signal of each read data bit at said corresponding sample times;

applying a plurality of different subsets of n of said binary words representing the sample signal value of each read data bit to an averaging means to derive an average on-time and early and late signal value of said words of each read data bit; and storing said average on-time and early and late signal values of the binary words of each subset in a different register.

7. A method of correcting timewise peak data bit shifts in data sequences each of which comprises a plurality of data bits wherein each data bit of a sequence having an analog peak signal amplitude less than a predetermined threshold value can be corrupted by a timewise shift of an adjacent data bit having an analog peak signal amplitude equal to or greater than said threshold value, said method comprising the steps of:

receiving analog signals representing each data bit of a sequence;

sampling each received data bit a plurality of times;

in response to said sampling, generating a plurality of time varying derived values of the signal amplitude for each received data bit of said sequence;

analyzing a first derived signal value for each data bit of said sequence to determine whether said sequence represents logical data;

applying said sequence to an output for use by utilization means if said sequence is determined to represent logical data;

determining that said sequence contains a data bit whose signal amplitude has been corrupted by a timewise shift of a signal of an adjacent data bit;

substituting an alternate derived signal value of said corrupted data bit for said first signal value of said corrupted data bit to form a data bit sequence comprising logical data; and applying said corrected sequence to said output for use by said utilization means.

8. The method of claim 7 wherein said step of determining comprises the step of determining whether a read data bit has been corrupted by an early or a late shift of an analog signal representing adjacent data bit, and wherein said step of substituting said alternate derived signal value comprises the steps of:

substituting an early signal value for said corrupted data bit if said corruption is caused by an early peak signal shift of an analog signal for said adjacent data bit; and substituting a late signal value for said corrupted data bit if said corruption has been caused by a late peak signal shift of an analog signal for said adjacent data bit.

9. Apparatus for correcting timewise peak data bit shifts in data sequences each comprising a plurality of data bits wherein a binary 0 of a sequence is represented by an analog signal peak having an amplitude less than a threshold value and a binary 1 of a sequence is represented by an analog signal peak having an amplitude equal to or greater than said threshold value, said apparatus comprising:

means for receiving signals representing data bits of a sequence;

means for sampling each received signal a plurality of times;

means responsive to said sampling for generating a first and at least a second derived value of the signal amplitude for each data bit of said sequence;

means for analyzing said first derived value of the signal amplitude for each data bit of said sequence to determine whether said sequence as characterized by said derived first value of each data bit represents logical data;

means for applying said first derived value of said signal amplitude of each data bit of a sequence to an output for use by utilization means if the data bits of said sequence represents logical data;

means for determining that said sequence contains a 0 whose analog signal has been corrupted by a timewise peak data bit shift of an analog signal representing an adjacent 1;

means for substituting said second derived value of said signal amplitude of said corrupted 0 in place of said first derived value of said signal amplitude of said corrupted 0 to form a data bit sequence representing logical data; and said means for applying being effective for applying said corrected sequence to said output for use by said utilization means.

10. The apparatus of claim 9 wherein said means for receiving and sampling said analog signal representing said data bits comprises:

means for reading said analog signals representing each data bit of a sequence from a storage medium;

means for applying said analog signals representing each read data bit to an analog to digital (A/D) converter;

means for operating said A/D converter at a plurality of sample times for each read data bit to generate a corresponding plurality of multibit binary words each of which represents the amplitude of said analog signal of each data bit at each of said sample times;

means for applying a plurality of different subsets of n of said binary words representing the analog signal amplitude of each read data bit to an averaging means to derive an average signal amplitude of said words of each subset;

means for storing said averaged signal amplitude of each subset of binary words in different registers; and wherein said means for analyzing comprises means for determining whether the contents of said registers representing said read data bits of a sequence comprises logical data.

11. The apparatus of claim 10 wherein said plurality of said subsets of binary words of each read data bit together represent an on-time and an early and a late value of the analog signal amplitude of each said read data bit, and wherein said means for determining and substituting comprise:

means for determining whether the on-time signal value of a ∅ in said sequence has been corrupted by an early or a late peak signal shift of an adjacent 1;

means for substituting an early signal value for said corrupted ∅ in place of said on-time signal value if said corruption is caused by an early peak shift of a signal representing an adjacent 1; and means for substituting a late signal value for said corrupted ∅ in place of said on-time signal value if said corruption is caused by a late peak shift of a signal representing an adjacent 1.

12. The apparatus of claim 11 wherein said early and on-time and late signal values of each read data bit of said sequence are stored in different registers of different register stages each of which is unique to a different data bit of said sequence and wherein said registers are operated to bypass a register containing a corrupted on-time signal value of ∅ of a data bit and to substitute the early or late signal value of said data bit stored in said another register stage as a replacement of said corrupted on-time signal value of ∅.

13. Apparatus for correcting timewise peak data bit shifts in data sequences each comprising a plurality of data bits wherein a binary ∅ of a sequence is represented by an analog signal peak having an amplitude less than a threshold value and a binary 1 of a sequence is represented by an analog signal peak having an amplitude equal to or greater than said threshold value, said apparatus comprising:

means for receiving analog signals representing the data bits of a sequence from a storage medium;

means for sampling each received signal a plurality of times;

means responsive to said sampling for deriving an on-time value of the amplitude of a sampled signal for each data bit in said sequence;

means responsive to said sampling for deriving an early signal value of the amplitude of said sampled signal of each data bit in said sequence;

means responsive to said sampling for deriving a late signal value of the amplitude of said sampled signal of each data bit in said sequence;

means for analyzing said on-time signal value for each data bit of said sequence to determine whether said sequence represents logical data;

means for applying said sequence to an output for use by utilization means if said sequence is determined to represent logical data;

means for determining that said sequence contains a ∅ whose on-time signal has been corrupted by a timewise peak data bit shift of a signal representing an adjacent 1;

means for substituting a said early signal value of said corrupted ∅ in place of said on-time value of said corrupted ∅ to form a data bit sequence representing logical data when said corrupted ∅ is due to an early peak signal shift of a signal representing an adjacent 1;

means for substituting said late signal value of said corrupted ∅ to form a data bit sequence representing logical data when said corrupted ∅ is due to a late peak signal shift of an adjacent 1;

said means for applying being effective for applying said corrected sequence to said output for use by said utilization means.

14. The apparatus of claim 13 wherein said means for receiving and sampling and analyzing said data bits comprises:

means for reading an analog signal representing each data bit of a sequence from said storage medium;

means for applying an analog signal representing each read data bit to an analog to digital (A/D) converter;

means for operating said A/D converter at a plurality of sample times for each read data bit to generate a multidata bit binary word representing the amplitude of the analog signal of said each read data bit at each sample time;

means for applying a plurality of different subsets of n of said binary words representing the signal value of said each read data bit to an averaging means to derive an average on-time and said early and said late value of said binary words of each read data bit;

means for storing the average on-time and late signal value of the binary words of each data bit in a different register; and means for being effective for analyzing the contents of said registers to determine whether the read data bits of a sequence represent logical data.

15. Apparatus for correcting timewise peak data bit shifts in data sequences each of which comprises a plurality of data bits wherein each data bit having an analog peak signal amplitude less than a predetermined threshold value can be corrupted by a timewise shift of an adjacent data bit having an analog peak signal amplitude equal to or greater than said threshold value, said apparatus comprising:

means for receiving analog signals representing each data bit of a sequence;

means for sampling each received data bit a plurality of times;

means responsive to said sampling for generating a plurality of time varying derived values of the signal amplitude of each received data bit of said sequence;

means for analyzing a first derived signal value of each data bit of said sequence to determine whether said sequence represents logical data;

means for applying said sequence to an output for use by a utilization means if said sequence is determined to represent logical data;

means for determining that said sequence contains a data bit whose signal has been corrupted by a timewise shift of a signal of an adjacent data bit;

means for substituting an alternate derived signal value of said corrupted data bit for said first signal value of said corrupted data bit to form a data bit sequence comprising logical data; and said means applying for being effective for applying said corrected sequence to said output for use by said utilization means.

16. The apparatus of claim 15 wherein said means for generating comprises means for deriving an on-time and an early and a late value of the amplitude of the signals of each of said received data bits of a sequence and wherein said means for determining and substituting said alternate value comprises:
  means for determining whether a data bit has been corrupted by an early or a late peak signal shift of an adjacent data bit;
  means for substituting an early signal value for said corrupted data bit if said corruption is caused by an early peak signal shift of an adjacent data bit; and
  means for substituting a late signal value for said corrupted data bit if said corruption has been caused by a late peak signal shift of an adjacent data bit.

* * * * *